US005958168A

United States Patent [19]
Liu et al.

[11] Patent Number: 5,958,168
[45] Date of Patent: Sep. 28, 1999

[54] INK JET RECORDING MATERIAL AND METHOD OF PRODUCING SAME

[75] Inventors: Bo Liu, Chiba; Tomomi Takahashi, Tokyo; Shun-ichiro Mukoyoshi, Ichikawa; Masami Kubota, Chiba, all of Japan

[73] Assignee: OJI Paper Co., Ltd., Tokyo, Japan

[21] Appl. No.: 08/997,881

[22] Filed: Dec. 24, 1997

[30] Foreign Application Priority Data

| | | | |
|---|---|---|---|
| Dec. 26, 1996 | [JP] | Japan | 8-347736 |
| Dec. 26, 1996 | [JP] | Japan | 8-347737 |
| Mar. 31, 1997 | [JP] | Japan | 9-080284 |

[51] Int. Cl.[6] .......... B44C 1/165; B29B 1/165; B32B 31/00; B05D 7/00

[52] U.S. Cl. .......... 156/230; 156/242; 156/247; 427/218; 427/256; 428/332

[58] Field of Search .......... 156/230, 242, 156/247, 272.7, 289; 118/76, 100, 101, 200, 202, 212, 243; 427/194, 218, 256; 428/195, 332

[56] References Cited

U.S. PATENT DOCUMENTS

| | | | |
|---|---|---|---|
| 4,301,210 | 11/1981 | Yasuda et al. | 428/342 |
| 4,613,525 | 9/1986 | Miyamoto et al. | 427/256 |
| 4,664,952 | 5/1987 | Arai et al. | 427/256 |
| 4,877,680 | 10/1989 | Sakaki et al. | 428/332 |
| 5,643,631 | 7/1997 | Donigan et al. | 427/218 |
| 5,670,242 | 9/1997 | Asano et al. | 428/212 |

FOREIGN PATENT DOCUMENTS

| | | | |
|---|---|---|---|
| 423 829 A1 | 10/1990 | European Pat. Off. . | |
| 732 219 A2 | 3/1996 | European Pat. Off. . | |
| 705710 A1 | 4/1996 | European Pat. Off. | B41M 5/00 |
| 803 374 A2 | 4/1997 | European Pat. Off. . | |
| A-59-146889 | 8/1984 | Japan . | |
| A-9-099633 | 4/1997 | Japan . | |
| A-9-286165 | 11/1997 | Japan . | |

OTHER PUBLICATIONS

Database WPI, Section Ch, Week 8618, Derwent Publications Ltd., London, G8, Class A97, AN 86–116622, XP002065564, & JP 61 057 380 A, (Mitsubishi Paper Mills Ltd).

*Primary Examiner*—David A. Simmons
*Assistant Examiner*—J. A. Lorengo
*Attorney, Agent, or Firm*—Armstrong, Westerman, Hattori, McLeland & Naughton

[57] ABSTRACT

An ink jet recording material having one or more ink receiving layers formed on a substrate and capable of recording clear ink images with a satisfactory gloss, a high color density and an enhanced water resistance is provided with at least one ink receiving layer containing agglomerate pigment particles pulverized in a cationic resin-containing liquid and having an average particle size of 1 μm or less.

4 Claims, 1 Drawing Sheet

INK JET RECORDING MATERIAL AND METHOD OF PRODUCING SAME

BACKGROUND OF THE INVENTION

1. Field of the Invention

The present invention relates to an ink jet recording material and a method of producing the same. Particularly, the present invention relates to an ink jet recording material capable of recording colored images having a high color density, a satisfactory gloss and an enhanced water resistance.

2. Description of the Related Art

An ink jet recording system is used to record colored images on a recording sheet by jetting imagewise ink drops through nozzles at a high speed to cohere the ink drops on a surface of the recording sheet and is advantageous in that full color printing is easy and in that the printing noise is low. This type of recording system use inks containing large amounts of a solvent and thus, to obtain a high color density of recorded images, the inks must be used in large amounts. Also, because the ink drops are continuously jetted, a disadvantage may occur in that, before early jetted ink drops are fully absorbed in the recording sheet to form early ink dots, later jetted ink drops reach the recording sheet to form later ink drops, and thus the later ink dots are fuse-connected to the early ink dots. Accordingly, the recording sheet for the ink jet recording system must be able to form ink dots with a high color density and a clear color tone, to absorb the jetted ink drops at a high absorbing rate so that even when the jetted ink drops overlap on the recording material surface, the ink drops are not mutually blotted.

Currently, in response to the rapid popularization of ink jet recording system, in the field of printing of publications and wrapping sheets, it is required to provide prints having a high gloss and a high color density. Especially, for full-color recording, plastic film-type and coated paper-type recording sheets are in high demand, because they exhibit excellent ink-receiving properties, for example, a high ink absorbing and fixing rate and a high ink absorption capacity, and thus can provide ink dots having a satisfactory form (truly circular) and a high sharpness.

Generally, since conventional inks for the ink jet recording system are water-soluble, the resultant ink images are disadvantageous in that the water and moisture resistance of the ink images are unsatisfactory. Accordingly, for the purpose of improving the moisture- and water-resistances, usually, a cationic resin is contained in the substrate paper sheet or the ink-receiving layer (recording layer).

For example, Japanese Examined Patent Publication No. 2-035,673 discloses an ink jet recording paper sheet prepared from a pulp slurry added with a pigment and a cationic resin. The pigment and the cationic resin contribute to enhancing the fixing of anionic dyes contained in the ink in the recording paper sheet, and to improving the moisture- and water-resistances of the fixed ink images.

Also, Japanese Unexamined Patent Publication No. 9-099,633 discloses a coated paper sheet usable for ink jet recording system, in which a coating layer comprising a pigment, for example, silica or alumina, is formed on a substrate sheet, to enhance the quality of images, for example, the sharpness of dots and the color density of images.

In the conventional coated paper sheets for the ink jet recording system, the coating layer comprises, as main components, pigment particles having a particle size in an order of several micrometers, a cationic resin and a binder, the pigment particles serve to absorb the ink and the cationic resin serves to fix the dyes contained in the absorbed ink.

The conventional ink jet recording material is, however, disadvantageous in that, since the pigment particles contained in the coating layer have a large particle size, the resultant coating layer is opaque, the surface thereof is rough, and the resultant ink images received in the coating layer have unsatisfactory gloss and color density.

An attempt has been made by the inventors of the present invention to enhance the color density of the recorded ink images. In this attempt, pigment colloidal particles having a particle size of 500 nm or less were prepared by pulverizing pigment particles, for example, silica particles, having a particle size in the order of micrometer by a mechanical dispersing method, and it was discovered that the resultant pigment colloidal particles contribute to enhancing the gloss and color density of the recorded ink images. However, the silica colloidal particles are anionic and thus have no fixing facility for the anionic dyes in the ink and the resultant recorded ink images exhibit an unsatisfactory moisture- and water-resistance. Also, it was discovered that when added with a cationic resin, the anionic pigment particles may be agglomerated and thus the transparency and surface smoothness of the coating layer may be decreased. Also, the agglomeration of the pigment particles due to the addition of the cationic resin may cause the viscosity of the coating liquid to increase, and thus the coating procedure with the viscosity-increased coating liquid may be difficult.

Also, in a previous attempt of the inventors of the present invention, a coating liquid for the ink jet recording material was prepared by absorbing a water-soluble resin into the surfaces of anionic colloidal particles, and then mixing the surface-treated colloidal particles with a cationic resin, as disclosed in Japanese Unexamined Patent Publication No. 9-263,039. In this method, the colloidal particles must be primary particles of the pigment which have a small surface area and have surfaces which can be fully covered by the water-soluble resin. If the colloidal particles are in the form of secondary particles which have a large ink absorption capacity, the particles have a significantly increased specific surface area, and thus it becomes difficult to completely cover the surfaces of the particles with the water-soluble resin. Also, the addition of the cationic resin may cause the particles of the pigment to be agglomerated and thus the viscosity of the resultant coating liquid to be increased. This phenomenon will cause the transparency and the surface smoothness of the resultant coating layer to be decreased.

If the water-soluble resin is used in an increased amount, the spaces formed between the colloidal particles and utilized to absorb the ink are decreased and thus the ink-absorption rate and capacity of the coating layer (ink-receiving layer) are decreased.

Generally speaking, in the preparation of an ink receiving layer, the smaller the particle size of the pigment particles contained in the ink receiving layer, the higher the transparency, surface smoothness and surface gloss of the resultant ink receiving layer and the color density of the recorded ink images. The pulverization of pigment particles is carried out basically by applying three types of forces, namely, a shearing force, an impact force and a compression force, alone or in combination, to the pigment particles. In a pulverization procedure in which the shearing force is mainly utilized, a conventional mixer and a Cowles disperser are used. In a pulverization procedure in which the impacting force is mainly utilized, a conventional jet mill is used. Also, in a pulverization procedure in which a combination of the shearing force with the impacting force is utilized, a conventional sand mill, a ball mill or a roll mill can be used.

In a conventional method for dispersing pigment particles for paints, usually a mechanical agitation-dispersing method using a mixer or Cowless disperser is used. This conventional method is, however, unsatisfactory to pulverize the pigment particles so as to cause the particle size of the pigment particles to be decreased, and to divide the agglomerates of secondary particles which have been formed from agglomerates of primary particles having a poor dispersion-stability into secondary particles having a size smaller than that of the secondary particle agglomerates.

In comparison with a mixer, a sand mill and a ball mill are excellent in dispersing facility and pulverizing facility. These mills utilize balls or beads as a dispersing medium and thus they are referred to as a dispersing medium-type disperser. When this type of disperser is used for the preparation of a coating liquid having a high viscosity, the shearing force is cut by the cushioning phenomenon of the dispersing medium. Therefore, the dispersing medium-type disperser is usable only for coating liquids having a low or medium degree of viscosity. For dispersing a paint having a high viscosity, the roll mill is advantageously used. However, the roll mill is unsatisfactory in its dispersing effect.

Japanese Unexamined Patent Publication No. 5-32413 discloses a method of pulverizing alumina sol secondary particles in which primary particles are easily agglomerated with each other, by using a ultrasonic vibration disperser in which not only a high shearing force but also a cavitation mechanism are utilized. However, the resultant dispersed alumina particles are unsatisfactory in that the particle sizes of the resultant secondary particles are too large and the resultant particle size distribution is too wide. Therefore, when the resultant finely dispersed paint is used, the resultant ink receiving layer is unsatisfactory due to the low transparency thereof. Also, since the particle size distribution is too wide, the adhesion of the particles to each other through a binder is insufficient and thus the resultant ink receiving layer may be easily cracked. Also, the dispersion procedure of the pigment particles needs a long time and a large amount of labor and thus the efficiency of the coating liquid preparation procedure for the ink receiving layer is poor.

SUMMARY OF THE INVENTION

An object of the present invention is to provide an ink jet recording material having an excellent gloss, surface-smoothness and ink-absorption and being capable of recording ink images having a high color density and excellent resistance to moisture and water, and a method of producing the same.

The above-mentioned object can be attained by the ink jet recording material and the method of producing the same, of the present invention.

The ink jet recording material of the present invention comprises a substrate and one or more ink receiving layers formed on the substrate, wherein at least one of the ink receiving layers is formed by coating or impregnating the substrate with an coating liquid prepared by pulverize-dispersing agglomerate pigment particles in a cationic resin-containing liquid to such an extent that the average particle size of the pulverize-dispersed pigment particles is 1 μm or less.

In a preferably embodiment of the ink jet recording material of the present invention, the at least one ink receiving layer is formed by mixing a dispersion containing fine pigment particles having an average particle size of 300 nm or less with a cationic resin to increase the viscosity of the dispersion and to agglomerate the fine pigment particles; subjecting the resultant dispersion to a pulverize-dispersing procedure to adjust the average particle size of the pulverize-dispersed agglomerate pigment particles to 1 μm or less; and then subjecting the resultant coating liquid to a coating or impregnating procedure.

In the method of the present invention for producing an ink jet recording material having one or more ink receiving layers on a substrate, at least one of the ink receiving layers is formed by coating a casting surface with a coating film layer comprising pigment particles prepared by pulverize-dispersing agglomerate pigment particles in a cationic resin-containing liquid to such an extent that the average particle size of the pulverize-dispersed pigment particles is 1 μm or less; and transferring the coating film layer to a surface of the substrate or, when the substrate surface is coated with another ink receiving layer, to the surface of the other ink receiving layer.

DESCRIPTION OF THE PREFERRED EMBODIMENTS

Figure 1:
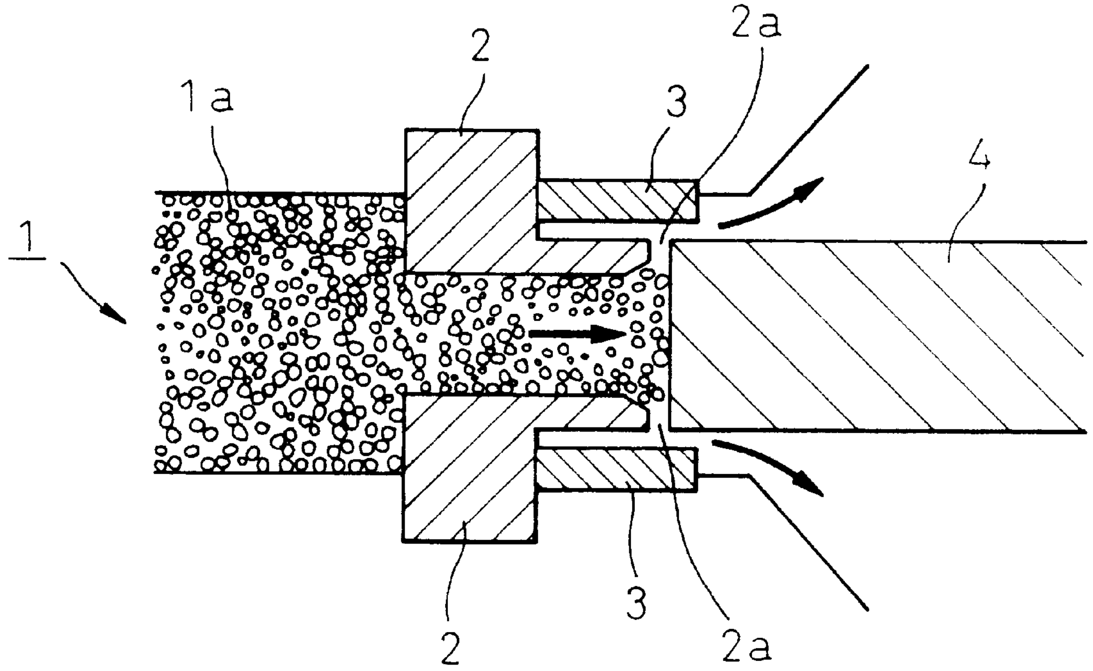
FIG. 1 is an explanatory cross-sectional profile of a pressure-type homogenizer for pulverize-dispersing agglomerate pigment particles usable for the present invention.

Generally, when pigment particles having a particle size in the order of micrometer are dispersed in a cationic resin or in a mixture of a cationic resin with a binder, naturally has relatively low gloss, smoothness and transparency, and thus the coating layer formed from the resultant coating liquid is not substantially affected even when the pigment particles are slightly agglomerated with each other. However, when the pigment particles have an average particle size of 1 μm or less, and are agglomerated with each other in a coating liquid, the resultant coating layer formed from the coating liquid exhibits a greatly decreased transparency, and has a roughened surface, and this is difficult to exhibit an excellent surface smoothness and gloss which are advantages to be obtained by using the fine pigment particles having a particle size of 1 μm or less.

The inorganic pigment particles, for example, silica pigment particles, exhibit an anionic property in water, and thus silica colloid particles consisting of agglomerate particles (secondary or tertiary particles) of primary silica particles exhibit an anionic property in water. The anionic silica fine particles have no fixing property for anionic dyes contained in the ink and thus, the printed ink images exhibit a poor resistance to moisture and water. To enhance the moisture and water resistance, it is necessary to add a cationic resin to the coating liquid. However, it is known that an addition of the cationic resin to the anionic silica colloid particle-containing coating liquid, the colloidal particles are immediately agglomerated, and thus the resultant coating layer exhibits unsatisfactory gloss and transparency.

To remove the above-mentioned disadvantages, before agglomerate silica particles having a particle size of from about 1 μm to about 50 μm are pulverized by a mechanical dividing force to provide a silica colloid particle dispersion, a cationic resin is mixed with the agglomerate silica particles, and the mixture is subjected to a mechanical pulverizing procedure to pulverize the agglomerated silica particles together with the cationic resin. The resultant dispersion contains finely and uniformly pulverized silica colloidal particles, in spite of the fact that the dispersion contains the cationic resin.

When the coating liquid prepared by the above-mentioned procedures is coated on or impregnated in a substrate, the resultant ink jet recording material exhibits a high gloss and can record ink images having a high color density, an excellent gloss, and a high moisture and water resistance. The reasons for the above-mentioned advantages are not completely clear. However, it is assumed that when the agglomerate silica particles are pulverized and dispersed in the presence of a cationic resin, an absorption of the cationic resin on the surfaces of the silica particles proceeds with the progress of the pulverization of the silica particles, and when the particle size of the silica particles reaches a level of 1 $\mu$m or less, preferably 500 nm or less, the absorption of the cationic resin on the silicon particle surfaces reaches an equilibrium condition, and thus substantially all of the surfaces of the silica particles are covered by the cationic resin.

The dispersion of pigment particles prepared by pulverize-dispersing agglomerate pigment particles in the presence of a cationic resin and, optionally, another water-soluble resin by mechanical means until the average particle size of the pulverize-dispersed particles reaches 1 $\mu$m or less, preferably 500 nm or less, has a high dispersion stability and exhibits a satisfactory coating aptitude, and is thus useful for forming an ink receiving layer of the ink jet recording material capable of recording ink images having a satisfactory gloss and a high color density.

In the ink jet recording material of the present invention, the ink receiving layer comprises pigment particles prepared by pulverize-dispersing agglomerated pigment particles in a cationic resin-containing liquid to an extent such that the average particle size of the pulverize-dispersed particles reaches 1 $\mu$m or less, preferably 500 nm or less. In the present invention, the pigment dispersion is preferably in the form of a colloidal solution or a slurry. The ink jet recording material of the present invention exhibits a high gloss and an excellent ink absorption and is capable of recording ink images with a high color density and a high moisture and water resistance.

In the ink jet recording material of the present invention, the substrate is not limited to specific materials and thus may be formed from a transparent material or opaque material. For example, the substrate preferably comprises a regenerated cellulose film, a plastic film, for example, polyethylene, polypropylene, soft polyvinyl chloride, hard polyvinyl chloride, or polyester film; a paper sheet, for example, a wood-free paper, a coated paper, an art paper, a cast-coated paper, a foil-laminated paper, a kraft paper, a polyethylene film-laminated paper, a resin-impregnated paper, a metalized paper or a water-soluble paper sheet; a metal foil; or a synthetic paper sheet. The synthetic paper sheet is, for example, a laminated synthetic paper sheet prepared by forming a film comprising pigment particles mixed in a thermoplastic resin; drawing the film to convert the film to a paper-like sheet; and laminating the paper-like sheet, as an uppermost layer, on at least one plastic film. This type of synthetic paper sheet are available, for example, under the trademark of YUPO®, from OJI YUKAGOSEISHI K.K.

The ink receiving layer of the ink jet recording material of the present invention has a simple layered structure or a multi-layered structure.

When the ink receiving layer has a single layer structure, this ink receiving layer contains, as a pigment component, at least one member selected from inorganic pigments, for example, silica, for example, amorphous silica, kaolin, alumina silicate, clay, calcined clay, zinc oxide, tin oxide, magnesium sulfate, aluminum oxide, aluminum hydroxide, quasi-boehmite, calcium carbonate, satin white, aluminum silicate, smectite, zeolite, magnesium silicate, magnesium carbonate, magnesium oxide, and diatomaceous earth pigments; and organic pigments, for example, styrene resin, urea resin and benzoguanamine resin pigments. Some of the pigments exhibit an ionic property and are influenced by pH. Usually, the inorganic pigments except for the alumina pigments are anionic pigments.

The pigment particle-containing coating liquid for the ink receiving layer can be prepared by using a conventional pigment in the following method.

The agglomerate pigment particles are dispersed in a medium such as water, a cationic resin is mixed with the dispersion, and then the resultant mixture is subjected to a mechanical pulverize-dispersion procedure until the average particle size of the pulverize-dispersed agglomerate pigment particles reaches 1 $\mu$m or less, preferably 500 nm or less, more preferably 10 to 300 nm which contributes to enhancing the color density of the ink images received in the ink receiving layer. To obtain the pulverize-dispersed agglomerate pigment particles having an average particle size of 1 $\mu$m or less, conventional agglomerate pigment particles having an average particle size of 1 to 50 $\mu$m are subjected to a mechanical pulverizing procedure under a high shearing force. For example, a breaking down method in which a material in the form of lumps is finely divided is applied to the conventional agglomerate pigment particles. The mechanical pulverizing means include ultrasonic pulverizers, high speed rotation mills, roll mills, container-drived medium mills, medium stirring mills, jet mills, mortars, sand grinders, pressure-type homogenizers and Cowless dispersers.

In the present invention, the average particle size of the pigment particles was determined as an average of Martin diameter by an electron microscope (SEM and TEM) observation, unless otherwise provided ("Microparticle Handbook" published by Asakura Shoten, 1991, page 52).

Among the above-mentioned mechanical pulverizing means, the pressure type homogenizer contributes to shortening the pulverizing time and to saving pulverizing labor and thus is most preferred in practice.

The structure and pulverizing mechanism of the pressure-type homogenizer will be explained with reference to FIG. 1.

The homogenizer of FIG. 1 has a pressing structure for pressurizing a dispersion to a desired pressure and a homovalve structure for generating a stirring effect.

In FIG. 1, a dispersion 1 to be heated and containing a plurality of solid particles 1*a* is pressurized by a pump (not shown in FIG. 1), and fed into a valve seat 2 under high pressure at a low flow velocity. After the dispersion is compressed in the valve seat 2, the dispersion passes through a narrow space 2*a* between the valve seat 2 and a homovalve 4 at a high flow velocity and impacts an impact ring 3. This impact causes generation of cavitation which promotes the homogenization of the dispersion and the pulverization of the pigment particles. This type of disperser has a high dispersing capacity and can smoothly disperse the coating liquid even if it contains solid particles or has a high viscosity.

Preferably, the pressure is 250 kg/$cm^2$ or more, more preferably 550 kg/$cm^2$ or more. The pressure-type homogenizer can fully impart a super pressure of about 1000 kg/$cm^2$ and can pressurize to higher than 2 1000 kg/$cm^2$. The average particle size of the pulverize-dispersed particle is preferably 10 nm to 300 nm, more preferably 10 nm to 200 nm, still more preferably 20 to 150 nm.

When a silica or alumina silicate pigment is used as fine particles, an ink receiving layer having satisfactory transparency, surface smoothness and gloss can be obtained.

It is assumed that the pigment particles pulverize-dispersed by the pressure-type homogenizer under pressure can be controlled to a uniform particle size having a narrow particle size distribution range, and thus the above-mentioned excellent effects can be obtained. In the particle size distribution after the pulverize-dispersing procedure, a fraction of the particles having a particle size of from 50 nm below to 50 nm above the average particle size is preferably in an amount of 70% in number or more based on the total number of the particles. Namely, the particles having a particle size between 50 nm below and 50 nm above the average particle size are preferably in a content of 70% in number or more, more preferably 85% in number or more, based on the total number of the particles. When the particles are agglomerated particles, the particle size is an agglomerated particle size.

The primary particles from which the agglomerated particles are formed, preferably have an average primary particle size of 3 to 40 nm. When the primary particle size is smaller than 3 nm, the resultant pigment particles may exhibit a reduced ink absorption. Also, when the primary particle size is more than 40 nm, the resultant ink receiving layer may exhibit an unsatisfactory transparency.

In view of an easy pulverizing property and of dispersion stability, the pigment usable for the ink receiving layer of the ink jet recording material of the present invention is preferably selected from amorphous silica, alumina silicate, zeolite, and calcium carbonate pigments, more preferably amorphous silica and aluminum silicate pigments. The alumina silicate pigment is in the form of composite fine particles synthesized from an aluminum alkoxide and silicon alkoxide, as principal components, by a hydrolysis method. In the composite fine particles, the alumina components and silica components are combined with each other in such a manner that the alumina and silica components cannot be individually isolated from each other.

The ink receiving layer may contain, in addition to the above-mentioned specific pigment particles prepared by the above-mentioned pulverize-dispersing procedure, conventional pigments, for example, silica, colloidal silica, alumina, and calcium carbonate pigments and plastic pigments, unless the transparency and the gloss of the ink receiving layer are deteriorated. The additional pigment may improve the ink absorption of the ink receiving layer.

The cationic resins usable for the present invention are not limited to a specific type of resins and preferably selected from water-soluble cationic resins and cationic resins in the form of an aqueous emulsion. Usually, polyalkylenepolyamines, for example, polyethylenepolyamines and polypropylenepolyamines, and derivatives thereof, for example, polypropylenepolyallylamine and polypropylenepolydiallylmethylamine; acrylic resins having a tertiary amino group and/or a quaternary ammonium group; and diarylamine compounds are employed alone or in a mixture of two or more thereof.

For example, the cationic resins usable for the present invention include cationic dicyan resins, typically dicyandiamide-formaldehyde poly-condensation products; cationic polyamine resins, typically dicyandiamide-diethylenetriamine poly-condensation products; and polycation cationic resins, for example, epichlorohydrin-dimethylamine addition-polymerization products, dimethyldiallylammonium chloride-$SO_2$ copolymers, diallylamine salt-$SO_2$ copolymers, dimethyldiallylammonium chloride polymers allylamine polymers; dialkylamino-ethyl (meth)acrylate-quaternary salt polymers, and acrylamide-diallylamine salt copolymers. The amount of the cationic resin to be added to the ink receiving layer is preferably controlled in a range between 1 and 30 parts by weight, more preferably 3 and 20 parts by weight, based on 100 parts by weight of the pigment. Of course, a small amount of the cationic resin may be mixed with the pigment before the pulverize-dispersing procedure, and then after the pigment particles are pulverize-dispersed into a derived particle size, the remaining amount of the cationic resin may be mixed with the pulverize-dispersed pigment particles. The cationic resins can be employed alone or in a mixture of two or more thereof.

In the preparation of the coating liquid for the ink receiving layer, at least one additive for the conventional coated paper sheets, selected from, for example, dispersing agents, thickening agents, antifoaming agents, coloring materials, antistatic agents and preservative agents, is optionally added to the coating liquid before, during or after the pulverize-dispersing procedure.

In the ink receiving layer of the present invention, a binder is contained. As the binder, conventional binders usually employed in the production of coated paper sheets can be used. The binder preferably comprises at least one member selected from water-soluble resins, for example, polyvinyl alcohols (which will be referred to as PVA hereinafter), casein, soybean protein, synthetic proteins, starch, and cellulose derivatives, for example, carboxymethylcellulose and methylcellulose; and water-insoluble resins, for example, conjugated diene polymers, for example, styrene-butadiene copolymers and methyl methacrylate-butadiene copolymers, acrylic polymers and vinyl copolymers, for example, styrene-vinyl acetate copolymers, which are in the form of a latex or an aqueous dispersion. The binders can be employed alone or in a mixture of two or more thereof.

The binders usable for the present invention are preferably selected from water-soluble resins. The reasons why the water soluble resins are preferable for the present invention are not fully clear. It is assumed that the water-soluble resin can cover at least portions of the surfaces of the pigment particles such as silica particle, whereas the water-insoluble resin latex is not compatible with the pigment particle surfaces, and thus the compatibility of the cationic resin to the pigment particles is promoted by the water-soluble resin.

The binder can be mixed in a whole amount or partial amounts with the pigment particles before, during or after the pulverize-dispersing procedure of the pigment particles and, preferably, a portion of the binder is mixed together with the cationic resin with the pigment particles before the pulverize-dispersing procedure. The amount of the binder to be mixed with the pigment particles before the pulverize-dispersing procedure is preferably 5 to 50%, more preferably 10 to 40%, based on the total amount of the binder. When the whole amount of the binder is mixed with the pigment particles before the pulverize-dispersing procedure, the binder may be absorbed in spaces formed between the primary particles of the agglomerate pigment particles, and thus the resultant ink receiving layer may exhibit a reduced ink absorption.

There is no specific limitation to the mixing dry weight ratio of the pigment to the binder for the ink receiving layer. Preferably, the binder is used in a dry amount of 5 to 200 parts by weight, more preferably 10 to 100 parts by weight, per 100 parts by weight of the pigment. If too much binder is used, the fine spaces between the pigment particles may become too small, and thus the resultant ink receiving layer may exhibit an unsatisfactory ink absorption capacity and rate. Also, when the amount of the binder is too small, the resultant ink receiving layer may be easily cracked.

There is no limitation to the amount of the ink receiving layer. Usually, the ink receiving layer is formed in a controlled dry amount of 1 to 100 g/m$^2$, preferably 5 to 70 g/m$^2$. When the amount of the ink receiving layer is too small, it may be difficult to obtain an ink receiving layer with a high uniformity. Also, if the amount of the ink receiving layer is too high, the effect thereof may be saturated and the resultant ink receiving layer may easily crack.

When two or more ink receiving layers are formed on a substrate, at least one of the ink receiving layers must contain the colloidal pigment particles prepared by the above-mentioned method and having a particle size of 1 $\mu$m or less, preferably 500 nm or less. The others of the ink receiving layers have the similar basic constitution to that of the above-mentioned layer. Namely, the other layers may comprise the pigment which is not limited to that having a small particle size and the binder as mentioned above. The binder may comprise the above-mentioned polymeric materials.

In another embodiment of the ink jet recording material of the present invention, at least one ink receiving layer is formed from a pigment dispersion which is prepared by agglomerating or thickening a dispersion of fine pigment particles with an average particle size of 300 nm or less by adding a cationic resin to the dispersion; and re-pulverize-dispersing the pigment particles into an average particle size of 1 $\mu$m or less, preferably 500 nm or less, to prepare the coating liquid. In this embodiment, an ink jet recording material having a high gloss and capable of recording thereon ink images having a high color density and excellent resistance to moisture or to water. In this embodiment, the substrate may be formed from the above-mentioned transparent or opaque materials.

The fine pigment particles, for example, fine amorphous silica particles and alumina silicate particles having an average particle size of 300 nm or less are prepared by the following procedures.

Namely, pigment particles are dispersed in water, and pulverized by a mechanical method into an average particle size of 300 nm or less. The average particle size of the pulverized pigment particles is preferably 200 nm or less, more preferably 150 nm or less.

The fine pigment particles with the average particle size of 300 nm or less are preferably secondary particles of a pigment. The primary particle from which the secondary particles are formed preferably has an average particle size of 3 to 40 nm.

When the primary particle size is too small, the resultant ink receiving layer may exhibit an unsatisfactory ink absorption. Also, if it is too large, the resultant ink receiving layer may exhibit an insufficient transparency.

To provide the secondary pigment particles having an average particle size of 300 nm or less, a strong pulverizing force is applied to conventional pigment particles, each having a particle size of several micrometers, by mechanical means, namely, the above-mentioned breaking-down method in which a lump-shaped material is finely divided.

The cationic resins usable for the embodiment can be selected from the above-mentioned water-soluble cationic resins and aqueous cationic resin emulsions.

The binder usable for the embodiment can be selected from the above-mentioned water-soluble resins, for example, PVA. The binder may be mixed with the dispersion of the pigment particles before, during or after the cationic resin is added to the pigment particle dispersion. Preferably the binder is mixed with the pigment particle dispersion before the addition of the cationic resin. The reasons for the preferability are not fully clear. However, it is assumed that the binder can be absorbed by the surfaces of the pigment particles so as to restrict the ionic (anionic) property of the pigment particles to a certain extent, and thus the cationic resin can be easily mixed with the pigment particle dispersion.

In this embodiment, the dry solid mixing ratio of the pigment particles to the binder is preferably controlled to 100:5 to 100:200, more preferably 100:10 to 100:100. When the proportion of the binder is too high, the fine spaces between the pigment particles in the resultant ink receiving layer may be too small and thus the resultant ink receiving layer may exhibit a decreased ink absorption rate. Also, if the binder proportion is too low, the resultant ink receiving layer may be easily cracked.

Further, in the embodiment, the ink receiving layer may contain a conventional additive, for example, a dispersing agent, thickening agent, antifoaming agent, coloring materials, antistatic agent, and preservative agent, which is commonly used for coated paper sheet. In the preparation of the coating liquid. The additive may be added in a desired amount into the pigment dispersion, before, during or after the pulverize-dispersing procedure.

When the cationic resin is added into the fine pigment particle dispersion, the dispersion is thickened and agglomerated and, then, the pigment particles are re-pulverize-dispersed into an average particle size of 1 $\mu$m or less, preferably 500 nm or less, more preferably 300 nm or less. The pulverize-dispersing procedure can be conducted by mechanical means. As the mechanical means an ultrasonic homogenizer, a homomixer, a high speed rotation mill, a roller mill, a container-driving medium mill, a medium-stirring mill, a jet mill, a sand grinder or a pressure type homogenizer can be utilized.

In this embodiment, the colloidal pigment secondary particles are agglomerated by addition of the cationic resin into the pigment particle dispersion. In this case, the agglomerating force generated in this procedure is expected to be significantly weaker than that of the primary particles from which the secondary particles are formed. Therefore, the agglomeration of the secondary particles generated by the addition of the cationic resin can be broken by the mechanical force. However, it is very difficult to break the bonds of the primary particles to each other by the mechanical force. Accordingly, after the addition of the cationic resin, the re-pulverize-dispersion of the agglomerated pigment particles may face a limit at which the decreased average particle size of the agglomerated particles reaches approximately the same level as the original average particle size of the secondary particles. Accordingly, after the re-pulverize-dispersing procedure, the resultant dispersion is expected to contain tertiary particles consisting of the secondary particles and the cationic resin.

In this embodiment, there is no limitation to the amount of the ink receiving layer. Preferably, the amount of the ink receiving layer is controlled to 1 to 100 g/m$^2$, more preferably 5 to 70 $g/m^2$. When the amount is too small, it may be difficult to form the resultant ink receiving layer uniformly. Also, when the amount is too large the expected effect may be saturated and the resultant ink receiving layer may be easily cracked.

When two or more ink receiving layers are formed on a substrate, at least one of the ink receiving layers must contain the pigment particles prepared by the above-mentioned method. The ink-receiving layer containing the above-mentioned specific pigment particle preferably forms an outermost surface of the ink jet recording material. The other layers preferably have the same basic constitution as of the above-mentioned layer and may be pigment-containing layers comprising the same pigment which is not limited to that having a small particle size, and binder as mentioned above or polymer-containing layers comprising the same binder as mentioned above.

In the present invention, an ink receiving layer having an excellent gloss can be formed by forming the same coating layer as the specific ink receiving layer of the present invention on a smooth casting surface, and transferring the resultant layer from the casting surface to a surface of a substrate or another recording layer.

The casting surface can be provided by a high smoothness surface of a flexible sheet, for example, a regenerated cellulose fiber, a plastic resin film, for example, a polyethylene, polypropylene, soft polyvinyl chloride, hard polyvinyl chloride or polyester film; a paper sheet, for example, a polyethylene layer-laminated paper sheet, a glassine paper sheet, an impregnated paper sheet, or a metallized paper sheet; a metal foil; or a synthetic paper sheet, or a high smoothness surface of a glass, a metal or a plastic drum or plate. In consideration of production process and releasing aptitude of the resultant ink receiving layer from the casting surface, the polymer film (for example, polyethylene, polypropylene or polyester film) and the metallic drum having a high smoothness surface are preferably used.

To impart a high gloss to the ink receiving layer, the casting surface preferably has a high smoothness. For this purpose, the casting surface preferably has a surface roughness Ra (in accordance with Japanese Industrial Standard (JIS) B-0601) of 0.5 $\mu$m or less, more preferably 0.05 $\mu$m or less. The casting surface may be a semi-gloss surface or a mat surface formed by controlling the surface roughness.

The casting surface may be a non-coated surface. To arrange that the adhesive force between the ink-receiving layer and the substrate or another ink receiving layer is higher than that between the casting surface and the ink receiving layer formed on the casting surface, the casting surface may be coated with a releasing compound, for example, a silicone compound or a fluorine-containing resin.

The ink receiving layer of the present invention can be formed by using a conventional coating device, for example, blade coater, air knife coater, roll coater, bar coater, gravure coater, rod blade coater, lip coater, curtain coater or die coater, or a conventional impregnating device, for example, a size press.

The ink applicable to the ink jet recording material of the present invention comprises, as indispensable components, a coloring material for forming colored images and a liquid medium for dissolving or dispersing the coloring material and, as an optional component, an additive comprising at least one member selected from dispersing agents, surfactants, viscosity-modifiers, specific resistance modifiers, pH-modifiers, mildewproofing agents, and dissolution or dispersion-stabilizers for the coloring materials.

The coloring material for the ink is not limited to specific dyes or pigments and can be selected from conventional direct dyes, acid dyes, basic dyes, reactive dyes, food dyes, disperse dyes, oil dyes and coloring pigments. The content of the coloring material in the ink is variable depending on the type of the liquid medium and the derived properties for the ink. In the ink applicable to the ink jet recording material of the present invention, the content of the coloring material is preferably 0.1 to 2% by weight which is similar to that of conventional inks.

The liquid medium of the ink applicable to the ink jet recording material of the present invention preferably comprises at least one member selected from water, and water-soluble organic solvents, for example, alkyl alcohols having 1 to 4 carbon atoms, for example, methyl alcohols, ethyl alcohol, n-propyl alcohol, isopropyl alcohol, n-butyl alcohol and isobutyl alcohol; hetones, for example, acetone; ketone alcohols, for example, diacetone alcohol; polyalkylene glycols, for example, polyethylene glycol and polypropylene glycol; alkylene glycols having 2 to 6 alkylene groups, for example, ethylene glycol, propylene glycol, butylene glycol, triethylene glycol, thio-diglycol, hexylene glycol and diethylene glycol; amides, for example, dimethylformamides; ethers, for example, tetrahydrofuran; and lower alkylethers of polyhydric alcohols, for example, glycerol, ethyleneglycolmethyl ether, diethyleneglycol methyl (or ethyl) ether, triethyleneglycol monomethylether.

EXAMPLES

The present invention will be further explained by the following examples which are merely representative and do not restrict the scope of the present invention in any way.

In Examples I-1 to I-3 and II-1 to II-4 and Comparative Examples I-1 to I-3 and II-1 to II-3, the particle size of the pigment particles were measured by the following method.

A dispersion containing pigment particles was diluted to a concentration of 0.5% by weight and a drop of the diluted dispersion was placed on a collodion film and air-dried. The dried layer of the pigment particles was observed by a transmission electron microscope (TEM) (Model: H-300, made by Hitachi Seisakusho) at a magnification of 20,000, 50,000 or 100,000, to determine the average particle size thereof.

Note: The primary particle size of the pigment particles does not change by pulverize-dispersing.

Example I-1

A dispersion was prepared by mixing 50 parts by weight of synthetic amorphous silica particles having an average primary particle size of 11 nm and an average secondary particle size of 3 $\mu$m (Nipsil® HD-2, made by Nippon Silica Industrial Co., Ltd., which will be referred to as HD-2 hereinafter), with 950 parts by weight of water and 2 parts by weight of sodium polyacrylate (Trademark: A-9, made by Toagosei Chemical Industry Co., Ltd. which will be referred to as A-9 hereinafter), and then with 5 parts by weight of a cationic resin, namely a diallyldimethylammonium chloride-acrylamide copolymer (Trademark: PAS®-J-81, made by Nitto Boseki Co., Ltd. which will be referred to as PAS-J-81, hereinafter), while stirring the mixture by a homomixer.

Then, the mixture was subjected to a pulverize-dispersing procedure by alternately using a sand grinder and a pressure-type homogenizer until the average particle size of the pigment particles reached 120 nm.

The resultant pigment particle dispersion was mixed with an aqueous solution of 10% by weight of a polyvinyl alcohol (Trademark: PVA 117, made by Kuraray Co., Ltd.) in a dry amount of 25 parts by weight, while stirring the mixture to provide a uniform coating liquid.

A polyethylene-laminated coated paper sheet was prepared by laminating a polyethylene film having a thickness of 15 μm on a coated paper sheet (Trademark: OK COAT®, basis weight: 127.9 g/m$^2$, made by Oji Paper Co., Ltd.) by an extrusion-laminating method. The resultant laminated paper sheet will be referred to as a laminated coat paper sheet.

The coating liquid was coated on the laminated coat paper sheet and dried to form an ink receiving layer having a dry weight of 20 g/m$^2$. An ink jet recording material of the present invention was obtained.

Example I-2

A dispersion was prepared by mixing 50 parts by weight of synthetic amorphous silica particles having an average primary particle size of 11 nm and an average secondary particle size of 3 μm (Nipsil® HD-2 by Nippon Silica Industrial Co., Ltd.) with 800 parts by weight of water and 2 parts by weight of sodium polyacrylate (Trademark: A-9, made by Toagosei Chemical Industry Co., Ltd.), and then with 5 parts by solid weight of a 10% aqueous polyvinyl alcohol solution (Trademark: PVA 117, made by Kuraray Co., Ltd.) and 5 parts by weight of the above-mentioned cationic resin, namely a diallyldimethylammonium chloride-acrylamide copolymer (Trademark: PAS®-J-81, made by Nitto Boseki Co., Ltd.), while stirring the mixture by a homomixer.

Then, the mixture was subjected to a pulverize-dispersing procedure by alternately using a sand grinder and a pressure-type homogenizer until the average particle size of the pigment particles reached 120 nm.

The resultant pigment particle dispersion was mixed with an aqueous solution of 10% by weight of a polyvinyl alcohol (Trademark: PVA 117, made by Kuraray Co., Ltd.) in a dry amount of 20 parts by weight, while stirring the mixture to provide a uniform coating liquid.

The coating liquid was coated on the same laminated coat paper sheet as in Example I-1 and dried to form an ink receiving layer having a dry weight of 20 g/m$^2$. An ink jet recording material of the present invention was obtained.

Example I-3

The same coating liquid as in Example I-2 was coated on a casting surface formed by a polyethylene terephthalate (PET) resin film having a thickness of 75 μm and a surface roughness Ra of 0.02 μm (Lumirror® T, made by Toray Industries Inc.) and dried to form a coating film with a dry weight of 20 g/m$^2$. Then, the same laminated coat paper sheet as in Example I-1 was superposed on the coating film in such a manner that the laminated polyethylene layer surface of the coat paper sheet came into contact with the surface of the coating film on the PET film surface and was calender-pressed at a temperature of 80° C. under a linear pressure of 30 kg/cm to adhere the coating film (ink receiving layer) to the laminated coat paper sheet. Then, the PET film was separated from the resultant ink jet recording material.

Comparative Example I-1

A coating liquid was prepared by mixing 50 parts by weight of synthetic amorphous silica particles having an average primary particle size of 11 nm and an average secondary particle size of 3 μm (Nipsil® HD-2, made by Nippon Silica Industrial Co., Ltd.) with 950 parts by weight of water and 2 parts by weight of sodium polyacrylate (Trademark: A-9, made by Toagosei Chemical Industry Co., Ltd.), and then with 5 parts by weight of a cationic resin, namely a diallyldimethylammonium chloride-acrylamide copolymer (Trademark: PAS®-J-81, made by Nitto Boseki K.K.) and 25 parts by dry weight of an aqueous solution of 10% by weight of a polyvinyl alcohol (Trademark: PVA-117, made by Kuraray Co., Ltd.) while stirring the mixture with a mixer, to provide a uniform coating liquid. In the resultant coating liquid, the silica particles had an average secondary particle size of 3 μm.

The coating liquid was coated on the same laminated coat paper sheet as in Example I-1 and dried to form an ink receiving layer having a dry weight of 20 g/m$^2$ to provide an ink jet recording material.

Comparative Example I-2

A dispersion was prepared by mixing 50 parts by weight of synthetic amorphous silica particles having an average primary particle size of 11 nm and an average secondary particle size of 3 μm (Nipsil® HD-2, made by Nippon Silica Industrial Co., Ltd.) with 950 parts by weight of water. The dispersion was subjected to a pulverize-dispersing procedure by alternately using a sand grinder and a pressure-type homogenizer until the average particle size of the silica particles reached 120 nm.

The resultant dispersion was mixed with 25 parts by solid weight of the same aqueous 10% polyvinyl alcohol (PVA 117) solution as in Example I-1 and 5 parts by weight of the same cationic resin (PAS-J-81) as in Example I-1, and the mixture was stirred to provide a uniform coating liquid. During the stirring, the viscosity of the liquid increased due to the addition of the cationic resin, and the particle size increased to 1.7 μm due to the agglomeration of the particles.

The coating liquid was coated on the same laminated coat paper sheet as in Example I-1 and dried to form an ink receiving layer having a dry weight of 20 g/m$^2$to provide an ink jet recording material.

Comparative Example I-3

A dispersion was prepared by mixing 50 parts by weight of synthetic amorphous silica particles having an average primary particle size of 11 nm and an average secondary particle size of 3 μm (Nipsil® HD-2, made by Nippon Silica Industrial Co., Ltd.) with 950 parts by weight of water. The dispersion was subjected to a pulverize-dispersing procedure by alternately using a sand grinder and a pressure-type homogenizer until the average particle size of the silica particles reached 120 nm.

The resultant dispersion was mixed with 25 parts by solid weight of the same aqueous 10% polyvinyl alcohol (PVA 117) solution as in Example I-1, and the mixture was stirred to provide a uniform coating liquid.

The coating liquid was coated on the same laminated coat paper sheet as in Example I-1 and dried to form an ink receiving layer having a dry weight of 20 g/m$^2$ to provide an ink jet recording material.

Test and Evaluation

In each of Examples I-1 to I-3 and Comparative Examples I-1 to I-3, the resultant ink jet recording material was subjected to the following tests and evaluations of ink absorption, gloss, and color density and water resistance of images.

In the testing of the gloss, color density and ink absorption, solid printing was applied to the ink jet recording material by using an ink jet printer (Trademark: BJC-600J, made by Canon Inc.), and the resultant solid image was subjected to measurements of gloss and color density.

[Water resistance of images]

A ink jet printed recording material was left to stand in the ambient atmosphere for 24 hours, a water drop was placed on the images for 30 minutes, then the water drop was wiped up and the trace of the water drop was observed, and evaluated as follows.

| Class | Water drop trace |
|---|---|
| 3 | Substantially no blotting of ink was found |
| 2 | Blotting of ink was found and decrease in color density of images was recognized |
| 1 | Almost all of ink images were removed |

[Ink absorption]

Printing with each of yellow, magenta and cyan-colored inks was applied to the ink jet recording sheet and, immediately after the printing, at time intervals of 5 seconds, a wood-free paper sheet was superposed on the printed surface of the recording sheet and the transfer of the ink from the recording sheet to the superposed paper sheet was checked to determine the necessary time to dry the ink on the recording sheet. The test result was evaluated as follows.

| Class | Drying time | Ink absorption |
|---|---|---|
| 3 | <10 seconds | Excellent |
| 2 | 10 to 30 seconds | Good |
| 1 | >30 seconds | Bad |

[Color density of images]

The solid printed images in black were subjected to the measurement of color density by Macbeth® Reflection Color Density Tester RD-920. The measurement was repeated 5 times, and the color density of the images was represented by an average of the 5 measurement data.

[Gloss of images]

The ink images of the printed recording sheet were observed by naked eye at an angle of 20 degrees from the surface of the recording sheet and the gloss of the images was evaluated as follows.

| Class | Gloss |
|---|---|
| 4 | Similar to the gloss of silver salt type photograph images, Excellent |
| 3 | Slightly lower than the gloss of silver salt type photograph images, Satisfactory |
| 2 | Similar to the gloss of print images on conventional coated paper sheet |
| 1 | Similar to the gloss of print images on conventional PPC |

The test results are shown in Table 1.

TABLE 1

| Example No. | | Item | | | |
|---|---|---|---|---|---|
| | | Ink absorption | Water resistance of images | Gloss of images | Color density of images |
| Example | I-1 | 3 | 3 | 3 | 2.05 |
| | I-2 | 3 | 3 | 3 | 2.10 |
| | I-3 | 3 | 3 | 4 | 2.21 |
| Comparative | I-1 | 3 | 3 | 1 | 1.46 |
| Example | I-2 | 3 | 3 | 1 | 1.56 |
| | I-3 | 3 | 1 | 3 | 2.08 |

Table 1 clearly shows that the ink jet recording sheets in accordance with the present invention have an excellent ink absorption and can record colored ink images having high gloss, color density and water resistance.

In Examples II-1 to II-4 and Comparative Examples II-1 to II-3, the ink jet recording materials were calender-treated by a calender under a linear pressure of 20 kg/cm, and a silica sol prepared by the following procedures was used.

[Silica sol]

A synthetic amorphous silica particles having an average secondary particle size of 3 μm and an average primary particle size of 11 nm (Nipsil® HD-2, made by Nippon Silica Industrial Co., Ltd.) were pulverize-dispersed in an aqueous medium by alternately using a sand grinder and a pressure-type homogenizer to an extent such that the average secondary particle size of the pulverize-dispersed silica particles reached 70 nm. A dispersion of the pulverize-dispersed silica particles in a content of 5% by weight was obtained.

[Measurement of particle size]

In measurement of particle size, the silica particle dispersion was diluted with water into a solid concentration of 0.5% by weight and a drop of the dispersion was placed on a collodion film and air-dried. The dried layer of the silica particles was observed by a transmission electron microscope (TEM) (Model: H-300, made by Hitachi Ltd.) at a magnification of 20,000, 50,000 and 100,000, to determine the average particle size of the silica particles.

Example II-1

A mixture was prepared by mixing 100 parts by solid weight of the silica sol with 30 parts by weight of a polyvinyl alcohol resin having a degree of polymerization of 3,500 and a degree of saponification of 99% or more (Trademark: PVA-135H, made by Kuraray Co., Ltd.) and 10 parts by weight of a cationic resin consisting of a diallyldimethylammonium chloride-acrylamide copolymer (PAS®-J-81, made by Nitto Boseki Co., Ltd.). The mixture had an increased viscosity and contained silica particles agglomerated with each other. The mixture was subjected to a pulverize-dispersing procedure by alternately using a sand grinder and a pressure-type homogenizer until the average particle size of the pulverize-dispersed silica particles reached 150 nm. A coating liquid having a solid content of 4% by weight was obtained.

The coating liquid was coated on a substrate sheet consisting of a coated paper sheet having a basis weight of 127.9 $g/m^2$ (OK Coat®, made by Oji Paper Co., Ltd.) and a polyethylene coating layer having a thickness of 15 μm was laminated on the coated paper sheet by an extrusion-laminating method and dried to form an ink receiving layer having a dry weight of 20 $g/m^2$.

An ink jet recording sheet was obtained.

Example II-2

A mixture was prepared by mixing 100 parts by solid weight of the silica sol with 30 parts by weight of a polyvinyl alcohol resin having a degree of polymerization of 3,500 and a degree of saponification of 99% or more (Trademark: PVA-135H, made by Kuraray Co., Ltd.) and 10 parts by weight of a cationic resin consisting of a diallyldimethylammonium chloride-acrylamide copolymer (PAS®-J-81, made by Nitto Boseki Co., Ltd.). The mixture had an increased viscosity and contained silica particles agglomerated with each other. The mixture was subjected to a pulverize-dispersing procedure by alternately using a sand grinder and a pressure-type homogenizer until the average particle size of the pulverize-dispersed silica particles reached 750 nm. A coating liquid having a solid content of 4% by weight was obtained.

The coating liquid was coated on a substrate sheet consisting of a coated paper sheet having a basis weight of 127.9 $g/m^2$ (OK Coat®, made by Oji Paper Co., Ltd.) and a polyethylene coating layer having a thickness of 15 $\mu$m was laminated on the coated paper sheet by an extrusion-laminating method and dried to form an ink receiving layer having a dry weight of 20 $g/m^2$.

An ink jet recording sheet was obtained.

Example II-3

An ink jet recording material was produced by the same procedures as in Example I-1, except that as a cationic resin, a diallyldimethylammonium chloride polymer (PAS®-H-10L, made by Nitto Boseki Co., Ltd.) was employed.

Example II-4

The same coating liquid as in Example II-1 was coated on a surface of a polyethylene terephthalate (PET) film having a thickness of 75 $\mu$m and a surface roughness Ra of 0.02 $\mu$m (Lumirror® T, made by Toray Industries Inc.) and dried to form a coating film layer having a dry weight of 20 $g/m^2$.

The same substrate sheet as in Example II-1 was superposed on the coating film layer of the PET film such a manner that the laminated polyethylene film layer came into contact with the coating film layer and was pressed by a calender at a temperature of 80° C. under a linear pressure of 30 kg/cm to bond the films to each other. Then, the PET film was separated from the resultant ink receiving layer fixed to the substrate. An ink jet recording material was obtained.

Comparative Example II-1

A dispersion was prepared by mixing 100 parts by solid weight of the silica sol with 40 parts by weight of a polyvinyl alcohol resin (PVA-135H, made by Kuraray Co., Ltd.). The resultant dispersion had a solid content of 4% by weight.

The dispersion was coated on a substrate sheet consisting of a coated paper sheet having a basis weight of 127.9 $g/m^2$ (OK Coat®, made by Oji Paper Co., Ltd.) and a polyethylene coating layer having a thickness of 15 $\mu$m was laminated on the coated paper sheet by an extrusion-laminating method and dried to form an ink receiving layer having a dry weight of 20 $g/m^2$.

An ink jet recording sheet was obtained.

Comparative Example II-2

A mixture was prepared by mixing 100 parts by solid weight of the silica sol with 30 parts by weight of a polyvinyl alcohol resin (Trademark: PVA-135H, made by Kuraray Co., Ltd.) and 10 parts by weight of a cationic resin consisting of a diallyldimethylammonium chloride-acrylamide copolymer (PAS®-J-81, made by Nitto Boseki Co., Ltd.). The mixture had an increased viscosity and contained silica particles agglomerated with each other. The mixture was subjected to a pulverize-dispersing procedure by alternately using a sand grinder and a pressure-type homogenizer until the average particle size of the pulverize-dispersed silica particles reached 1.5 $\mu$m. A coating liquid having a solid content of 4% by weight was obtained.

The coating liquid was coated on a substrate sheet consisting of a coated paper sheet having a basis weight of 127.9 $g/m^2$ (OK Coat®, made by Oji Paper Co., Ltd.) and a polyethylene coating layer having a thickness of 15 $\mu$m and laminated on the coated paper sheet by an extrusion-laminating method and dried to form an ink receiving layer having a dry weight of 20 $g/m^2$.

An ink jet recording sheet was obtained.

Comparative Example II-3

A dispersion having a solid content of 10% by weight was prepared by mixing 100 parts by solid weight of amorphous silica particles having an average agglomerate particle size of 4.5 $\mu$m (Finesil® X-45, made by Tokuyama Corp.) with 30 parts by weight of a polyvinyl alcohol resin (Trademark: PVA-135H, made by Kuraray Co., Ltd.) and 10 parts by weight of a cationic resin consisting of a diallyldimethylammonium chloride-acrylamide copolymer (PAS®-J-81, made by Nitto Boseki Co., Ltd.).

The dispersion was coated on a substrate sheet consisting of a coated paper sheet having a basis weight of 127.9 $g/m^2$ (OK Coat®, made by Oji Paper Co., Ltd.) and a polyethylene coating layer having a thickness of 15 $\mu$m was laminated on the coated paper sheet by an extrusion-laminating method and dried to form an ink receiving layer having a dry weight of 20 $g/m^2$.

An ink jet recording sheet was obtained.

Test and Evaluation

In each of Examples II-1 to II-3 and Comparative Examples II-1 to II-3, the resultant ink jet recording material was subjected to the following tests and evaluations of ink absorption, gloss, and color density and water resistance of images.

In the testing of the gloss, color density and ink absorption, solid printing was applied to the ink jet recording material by using an ink jet printer (Trademark: BJC-600J, made by Canon Inc.), and the resultant solid image was subjected to the measurements of gloss and color density.

[Water resistance of images]

An ink jet printed recording material was left to stand in the ambient atmosphere for 24 hours, a water drop was placed on the images for 30 minutes, then the water drop was wiped up and the trace of the water drop was observed, and evaluated as follows.

| Class | Water drop trace |
|---|---|
| 3 | Substantially no blotting of ink was found |

-continued

| Class | Water drop trace |
|---|---|
| 2 | Blotting of ink was found and decrease in color density of images was recognized |
| 1 | Almost all of ink images were removed |

[Gloss of images]

The ink images of the printed recording sheet were observed by naked eye at an angle of 20 degrees from the surface of the recording sheet and the gloss of the images was evaluated as follows.

| Class | Gloss |
|---|---|
| 4 | Similar to the gloss of silver salt type photograph images, Excellent |
| 3 | Slightly lower than the gloss of silver salt type photograph images, Satisfactory |
| 2 | Slight gloss |
| 1 | No gloss |

[Color density of images]

The solid printed images in black were subjected to a measurement of color density by Macbeth® Reflection Color Density Tester RD-920. The measurement was repeated 5 times, and the color density of the images was represented by an average of the 5 measurement data.

The test results are shown in Table 2.

TABLE 2

| Example No. | | Item | | |
|---|---|---|---|---|
| | | Water resistance of images | Gloss of images | Color density of images |
| Example | II-1 | 3 | 3 | 2.16 |
| | II-2 | 3 | 3 | 2.00 |
| | II-3 | 3 | 3 | 2.18 |
| | II-4 | 3 | 4 | 2.25 |
| Comparative Example | II-1 | 1 | 3 | 2.20 |
| | II-2 | 3 | 2 | 1.86 |
| | II-3 | 2 | 1 | 1.45 |

Table 2 clearly shows that the ink jet recording sheets in accordance with the present invention can record ink images having high gloss, color density and water resistance.

In each of Examples III-1 to III-6 and Comparative Examples III-1 to III-2, the particle size of pigment particles (agglomerate particle size of agglomerate pigment particles) was measured by using a laser particle size analysis system (Model: LPA-3000/3100, made by Otsuka Denshi K.K.) in accordance with a dynamic light scattering method.

Example III-1

An aqueous dispersion containing 100 parts by weight of synthetic amorphous silica particles having an average secondary particle size of 4.5 μm and an average primary particle size of 15 nm (Finesil® X-45, made by Tokuyama Corp.) was repeatedly subjected to a pulverize-dispersing procedure using a pressure-type homogenizer (Trademark: Super High Pressure Type Homogenizer GM-1, made by SMT, Company) under a pressure of 500 kg/cm$^2$.

The resultant aqueous dispersion will be referred to as dispersion A hereinafter.

In the dispersion A, the particle size of the silica particles distributed in the range of from 40 nm to 250 nm, the average particle size thereof was 90 nm, and 80% in number of the particles had a particle size of from 40 to 140 nm.

The dispersion A containing the synthetic amorphous silica particles in a solid amount of 100 parts by weight was mixed with 15 parts by weight of a diallyl-dimethylammonium chloride-acrylamide copolymer (PAS®-J-81, made by Nitto Boseki Co., Ltd.) and 40 parts by solid weight of a polyvinyl alcohol having a degree of polymerization of 3500 and a degree of saponification of 99% or more (Trademark: PVA-135H, made by Kuraray Co., Ltd.), and the resultant agglomerated dispersion was re-dispersed by stirring with a Cowles disperser (Multidisperser® PB95, made by SMT, Company), to provide a coating liquid having a solid content of 7% by weight. In this coating liquid, the particle size of the silica particles was distributed in the range of from 70 nm to 2 μm, the average secondary particle size was 180 nm and 55% in number of the silica particles had a particle size of from 130 nm to 230 nm.

The coating liquid was coated by a Meyer bar on a substrate sheet consisting of a paper sheet having a basis weight of 127.9 g/m$^2$ (OK Prince®, made by Oji Paper Co., Ltd.) and dried to form an ink receiving layer having a dry weight of 20 g/m$^2$. An ink jet recording material was obtained.

Example III-2

An ink jet recording material was prepared by the same procedures as in Example III-1, except that in the pulverize-dispersing procedure, the Cowles disperser (Multidisperser® PB95, made by SMT, Company) was replaced by a pressure type homogenizer (Trademark: Supper High Pressure Homogenizer GM-1, made by SMT, Company). In the resultant coating liquid, the particle size of the silica particles distributed in the range of from 40 to 300 nm, the average secondary particle size was 110 nm and 71% in number of the silica particles had a particle size of from 60 to 160 nm.

Example III-3

A dispersion B was prepared by the same procedures as for the dispersion A, except that the pressure applied to the pressure type homogenizer was changed from 500 kg/cm$^2$ to 800 kg/cm$^2$.

In the dispersion B, the particle size of the amorphous silica particles distributed in the range of from 35 to 180 nm, the average secondary particle size was 60 nm and 85% in number of the particles had a particle size of from 10 to 110 nm.

An ink jet recording material was produced by the same procedures as in Example III-2, except that the dispersion A was replaced by the dispersion B. After the re-pulverize-dispersing procedure, the resultant silica particles had a particle size distribution of from 35 to 200 nm, and an average secondary particle size of 70 nm and 75% in number of the particles had a particle size in the range of from 20 to 120 nm.

Example III-4

An aqueous dispersion containing 100 parts by weight of synthetic amorphous silica particles having an average secondary particle size of 3 μm and an average primary particle size of 11 nm (Nipsil® HD-2, made by Nippon Silica Industrial Co., Ltd.) was repeatedly subjected to a pulverize-dispersing procedure alternately using a sand grinder (Trademark: Six Cylinder type Sand Grinder, made by Igarashi Kikaiseizo K.K.) and a pressure-type homogenizer (Trademark: Super High Pressure Type Homogenizer GM-1, made by SMT, Company) under a pressure of 800 kg/cm$^2$.

The resultant aqueous dispersion having a solid content of 5% by weight will be referred to as dispersion C hereinafter.

In the dispersion C, the particle size of the silica particles was distributed in the range of from 30 nm to 150 nm, the average secondary particle size thereof was 50 nm, and 90% in number of the particles had a particle size of 100 nm or less.

The dispersion C in a solid amount of 100 parts by weight was mixed with 15 parts by weight of a diallyldimethylammonium chloride-acrylamide copolymer (PAS®-J-81, made by Nitto Boseki Co., Ltd.) and 40 parts by solid weight of a polyvinyl alcohol having a degree of polymerization of 3500 and a degree of saponification of 99% or more (Trademark: PVA-135H, made by Kuraray Co., Ltd.).

The resultant agglomerated dispersion with the cationic resin was re-dispersed by a pressure type homogenizer (Trademark: Super High Pressure Homogenizer GM-1, made by SMT, Company) under a pressure of 450 kg/cm$^2$, to provide a coating liquid having a solid content of 7% by weight.

In this coating liquid, the particle size of the silica particles distributed in the range of from 30 to 180 nm, the average secondary particle size was 60 nm, and 80% in number of the silica particles had a particle size of 10 to 110 nm.

The coating liquid was coated by a blade coater on a substrate sheet consisting of a paper sheet having a basis weight of 127.9 g/m$^2$ (OK Prince®, made by Oji Paper Co., Ltd.) and dried to form an ink receiving layer having a dry weight of 20 g/m$^2$. An ink jet recording material was obtained.

Example III-5

The same re-dispersed coating liquid as in Example III-4 was coated by a Meyer bar on a surface of a casting substrate consisting of a PET film having a thickness of 75 $\mu$m and a surface roughness Ra of 0.02 $\mu$m (Lumirror® T, made by Toray Industries Inc.) and dried to form a coating film layer having a dry weight of 20 g/m$^2$.

Then, a substrate sheet consisting of a coated paper sheet having a basis weight of 127.9 g/m$^2$ (OK Coat®, made by Oji Paper Co.) and a polyethylene film layer having a thickness of 15 $\mu$m was laminated on the coated paper sheet by an extrusion-laminating method, was superposed on the coating film layer in such a manner that the polyethylene film layer of the substrate came into contact with the coating film layer and was pressed by a calender at a temperature of 80° C. under a linear pressure of 30 kg/cm to fix the polyethylene film layer to the coated film layer. Then the PET film was separated from the resultant ink receiving layer.

An ink jet recording material was obtained.

Comparative Example III-1

An aqueous dispersion containing 100 parts by weight of synthetic amorphous silica particles having an average secondary particle size of 4.5 $\mu$m and an average primary particle size of 15 nm (Finesil® X-45, made by Tokuyama Corp.) was subjected to a pulverize-dispersing procedure using a Cowles stirrer (Trademark: Multidisperser PB95, made by SMT, Company). In the resultant aqueous dispersion, the silica particles had an average particle size of 4.5 $\mu$m.

The dispersion was mixed with 40 parts by solid weight of a polyvinyl alcohol having a degree of polymerization of 3500 and a degree of saponification of 99% or more (Trademark: PVA-135H, made by Kuraray Co., Ltd.), to provide a coating liquid having a solid content of 7% by weight.

The coating liquid was coated by a Meyer bar on a substrate sheet consisting of a paper sheet having a basis weight of 127.9 g/m$^2$ (OK Prince , made by Oji Paper Co., Ltd.) and dried to form an ink receiving layer having a dry weight of 20 g/m$^2$. An ink jet recording material was obtained.

Comparative Example III-2

An aqueous dispersion containing 100 parts by weight of synthetic amorphous silica particles having an average secondary particle size of 4.5 $\mu$m and an average primary particle size of 15 nm (Finesil® X-45, made by Tokuyama Corp.) was subjected to a pulverize-dispersing procedure using a supersonic vibration disperser (Trademark: US-600T, made by Nippon Seiki Co., Ltd.).

In the resultant aqueous dispersion, the particle size of the silica particles was distributed in the range of from 50 nm to 800 nm, the average secondary particle size thereof was 140 nm, and 60% in number of the particles had a particle size of from 90 to 190 nm.

The aqueous dispersion was mixed with 40 parts by solid weight of a polyvinyl alcohol having a degree of polymerization of 3500 and a degree of saponification of 99% or more (Trademark: PVA-135H, made by Kuraray Co., Ltd.), to provide a coating liquid having a solid content of 7% by weight.

The coating liquid was coated by a Meyer bar on a substrate sheet consisting of a paper sheet having a basis weight of 127.9 g/m$^2$ (OK Prince®, made by Oji Paper Co., Ltd.) and dried to form an ink receiving layer having a dry weight of 20 g/m$^2$. An ink jet recording material was obtained.

Test and Evaluation

In each of Examples III-1 to III-5 and Comparative Examples III-1 to III-2, the resultant ink jet recording material was subjected to the following tests and evaluations of gloss, and color density and water resistance of images.

In the testing of the gloss, color density and water resistance of images, solid printing was applied to the ink jet recording material by using an ink jet printer (Trademark: PM-700C, made by Epson Corp. Ltd.), and the resultant print was subjected to the measurements of gloss and color density and water resistance.

[Gloss of images]

The ink images of the printed recording sheet were observed by naked eye at an angle of 20 degrees from the surface of the recording sheet and the gloss of the images was evaluated as follows.

| Class | Gloss |
|---|---|
| 4 | Similar to the gloss of silver salt type photograph images, Excellent |

-continued

| Class | Gloss |
|---|---|
| 3 | Slightly lower than the gloss of silver salt type photograph images, Satisfactory |
| 2 | Slight gloss |
| 1 | No gloss |

[Smoothness of ink receiving layer

The surface smoothness of the ink receiving layer was observed by naked eye and evaluated as follows.

| Class | Surface smoothness |
|---|---|
| 4 | Very smooth |
| 3 | Surface roughness is small, satisfactory |
| 2 | Surface smoothness is unsatisfactory |
| 1 | Surface roughness is high and appearance is very bad |

[Water resistance of images]

A ink jet printed recording material was left to stand in the ambient atmosphere for 24 hours, a water drop was placed on the images for one minute, then the water drop was wiped up and the trace of the water drop was observed by naked eye and evaluated as follows.

| Class | Water drop trace |
|---|---|
| 4 | No blotting of ink was found |
| 3 | Substantially no ink blotting was found |
| 2 | Usable in practice while ink blotting was found |
| 1 | Ink blotting is found, and practical usability was low |

[Color density of images]

The solid printed images in black were subjected to the measurement of color density by a Macbeth® Reflection Color Density Tester RD-920. The measurement was repeated 5 times, and the color density of the images was represented by an average of the 5 measurement data.

The test results are shown in Table 3.

TABLE 3

| | | Item | | | |
|---|---|---|---|---|---|
| Example No. | | Gloss of images | Smoothness of ink receiving layer | Water resistance of images | Color density of images |
| | III-1 | 2 | 2 | 3 | 2.15 |
| | III-2 | 3 | 3 | 3 | 2.27 |
| | III-3 | 3 | 3 | 3 | 2.39 |
| | III-4 | 3 | 3 | 3 | 2.44 |
| | III-5 | 4 | 4 | 3 | 2.67 |
| Comparative | III-1 | 1 | 1 | 2 | 1.45 |
| Example | III-2 | 2 | 2 | 1 | 2.17 |

Table 3 clearly shows that the ink jet recording materials produced in accordance with the present invention have a high surface smoothness of the ink receiving layer and can record clear ink images having excellent gloss, color density and water resistance.

We claim:

1. A method of producing an ink jet recording material having one or more ink recording layers on a substrate, wherein at least one of the ink receiving layers is formed by coating a casting surface with a coating film layer comprising pigment particles prepared by pulverize-dispersing agglomerate pigment particles in a cationic resin-containing liquid to an extent such that the average particle size of the pulverize-dispersed pigment particles reaches 1 μm or less; and transferring the coating film layer to a surface of the substrate or, when the substrate surface is coated with an other ink receiving layer, to the surface of the other ink receiving layer.

2. The method as claimed in claim 1, wherein in the preparation of the pigment particles, a dispersion containing fine pigment particles with an average particle size of 300 nm or less is added to a cationic resin to increase the viscosity of the dispersion and to agglomerate the pigment particles, and then the resultant dispersion is subjected to a pulverize-dispersing procedure in which the agglomerated pigment particles are pulverized into an average agglomerated particle size of 1 μm or less.

3. The method as claimed in claim 1 or 2, wherein the pulverize-dispersed pigment particles have an average particle size of 500 nm or less.

4. The method as claimed in claim 1, wherein the pulverize-dispersed procedure is carried out by using a pressure-type homogenizer.

* * * * *